(12) United States Patent
Wu

(10) Patent No.: US 6,546,925 B1
(45) Date of Patent: Apr. 15, 2003

(54) BARBECUE GRILL ASSEMBLY

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 10/122,162

(22) Filed: Apr. 11, 2002

Related U.S. Application Data

(63) Continuation-in-part of application No. 10/035,698, filed on Oct. 25, 2001.

(51) Int. Cl.[7] .................................................. A47J 37/00
(52) U.S. Cl. ..................... 126/41 R; 126/9 R; 126/38; 126/276; 126/304 R
(58) Field of Search .............................. 126/9 R, 9 A, 126/25 R, 41 R, 40, 50, 38, 37 B, 276, 304 R; D7/332

(56) References Cited

U.S. PATENT DOCUMENTS 1,448,900 A * 3/1923 Moats .......................... 126/38
4,426,990 A * 1/1984 Shepherd ..................... 126/38
6,142,140 A * 11/2000 Shumaker ................... 126/9 B
D450,524 S * 11/2001 Measom ...................... D7/332

FOREIGN PATENT DOCUMENTS

FR 1105580 * 12/1955 ................. 126/9 R

* cited by examiner

Primary Examiner—James C. Yeung
(74) Attorney, Agent, or Firm—Ostrolenk, Faber, Gerb & Soffen, LLP

(57) ABSTRACT

A barbecue grill assembly includes a grill member disposed in a cooking base. The cooking base has left and right side walls extending upwardly from a bottom wall. A top cover is disposed on a top side of the cooking base for covering the cooking base. A side rack has one end portion pivoted to one of the left and right side walls of the cooking base. The side rack is turnable inwardly into the cooking base for moving to a folded position, and is further turnable outwardly from the cooking base for moving to an unfolded position. A fastening unit fastens releasably the top cover and the cooking base when the side rack is disposed at the folded position.

4 Claims, 7 Drawing Sheets

BARBECUE GRILL ASSEMBLY

CROSS-REFERENCE TO RELATED APPLICATION

This application is a continuation-in-part (CIP) of U.S. patent application Ser. No. 10/035,698, filed on Oct. 25, 2001, the entire disclosure of which is incorporated herein by reference.

BACKGROUND OF THE INVENTION

1. Field of the Invention

The present invention relates to a barbecue grill assembly, more particularly to a barbecue grill assembly having a cook unit with a side rack which is foldable so as to be received in the cook unit.

2. Description of the Related Art

FIG. 1 illustrates a conventional barbecue grill device 10 which includes a leg unit 11 and a cook unit 13 supported on the leg unit 11. The leg unit 11 includes four upright leg members 111. A pair of horizontal side racks 113 extend laterally and respectively from upper ends of two adjacent pairs of the leg members 111. As shown, since the leg members 111 are not foldable and since the side racks 113 are fixed to the leg members 111, the barbecue grill device 10 occupies a relatively large storage space when it is not in use. Moreover, a large packaging volume is required when the barbecue grill device 10 is packed for transport from a manufacturer to a retailer or a consumer.

In Applicant's co-pending U.S. patent application Ser. No. 10/035,698, there is disclosed a barbecue grill assembly with a cook unit and a casing. The cook unit has a cooking base, a grill member disposed in the cooking base, a top cover, and a handle formed on the top cover. The casing includes front and rear casing parts that have first edges hinged to each other, and second edges fastened releasably to each other by a pair of fastening units. The casing is formed with two handle openings at the second edges, and is mounted with a wheel unit and a pull member above the wheel unit. The casing confines a receiving space for receiving the cook unit. The handle on the cook unit is extendible through the handle openings. The pull member is operable for pulling the casing to move along a ground surface by virtue of rolling contact of the wheel unit with the ground surface. The casing is adapted to be disposed uprightly on a ground surface for supporting the cook unit thereon.

SUMMARY OF THE INVENTION

The main object of the present invention is to provide a barbecue grill assembly having a cook unit with a side rack which is foldable so as to be received in the cook unit when the cook unit is not in use.

Accordingly, the barbecue grill assembly of the present invention includes a cooking base, a grill member disposed in the cooking base, a top cover, a side rack and a fastening unit. The cooking base has a top side, a bottom wall opposite to the top side, and left and right side walls extending upwardly from the bottom wall. The top cover is disposed on the top side of the cooking base for covering the grill member and the top side of the cooking base. The side rack has one end portion pivoted to one of the left and right side walls of the cooking base. The side rack is turnable inwardly into the cooking base for moving to a folded position in which the side rack is disposed within the cooking base above the grill member and is covered by the top cover when the top cover is capped on the cooking base. The side rack is further turnable outwardly from the cooking base for moving to an unfolded position in which the side rack is disposed horizontally adjacent to said one of the left and right side walls of the cooking base. The fastening unit is mounted on the top cover and the cooking base, and fastens releasably the top cover and the cooking base when the side rack is disposed in the folded position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
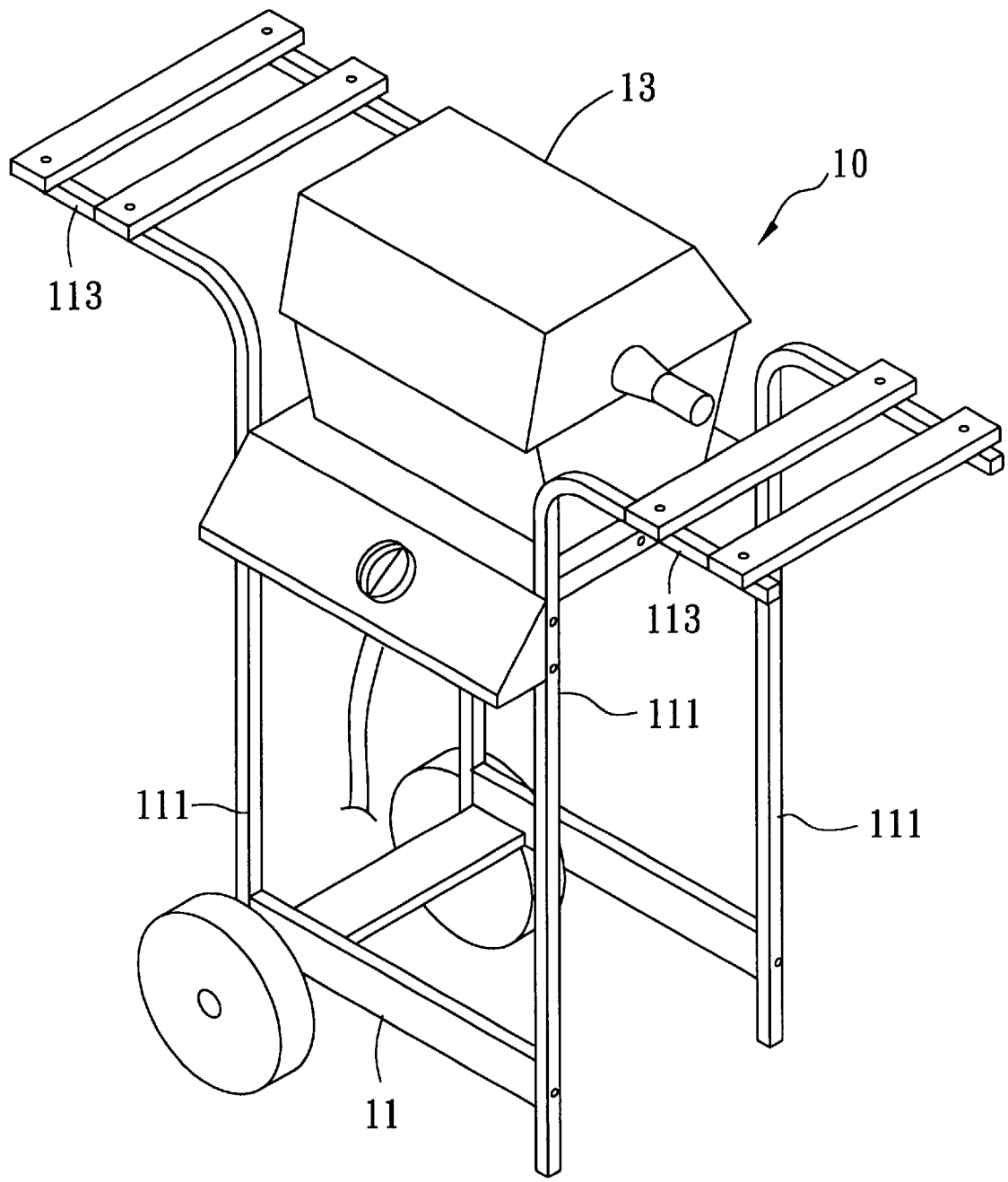
FIG. 1 is a perspective view of a conventional barbecue grill device.
Figure 2:
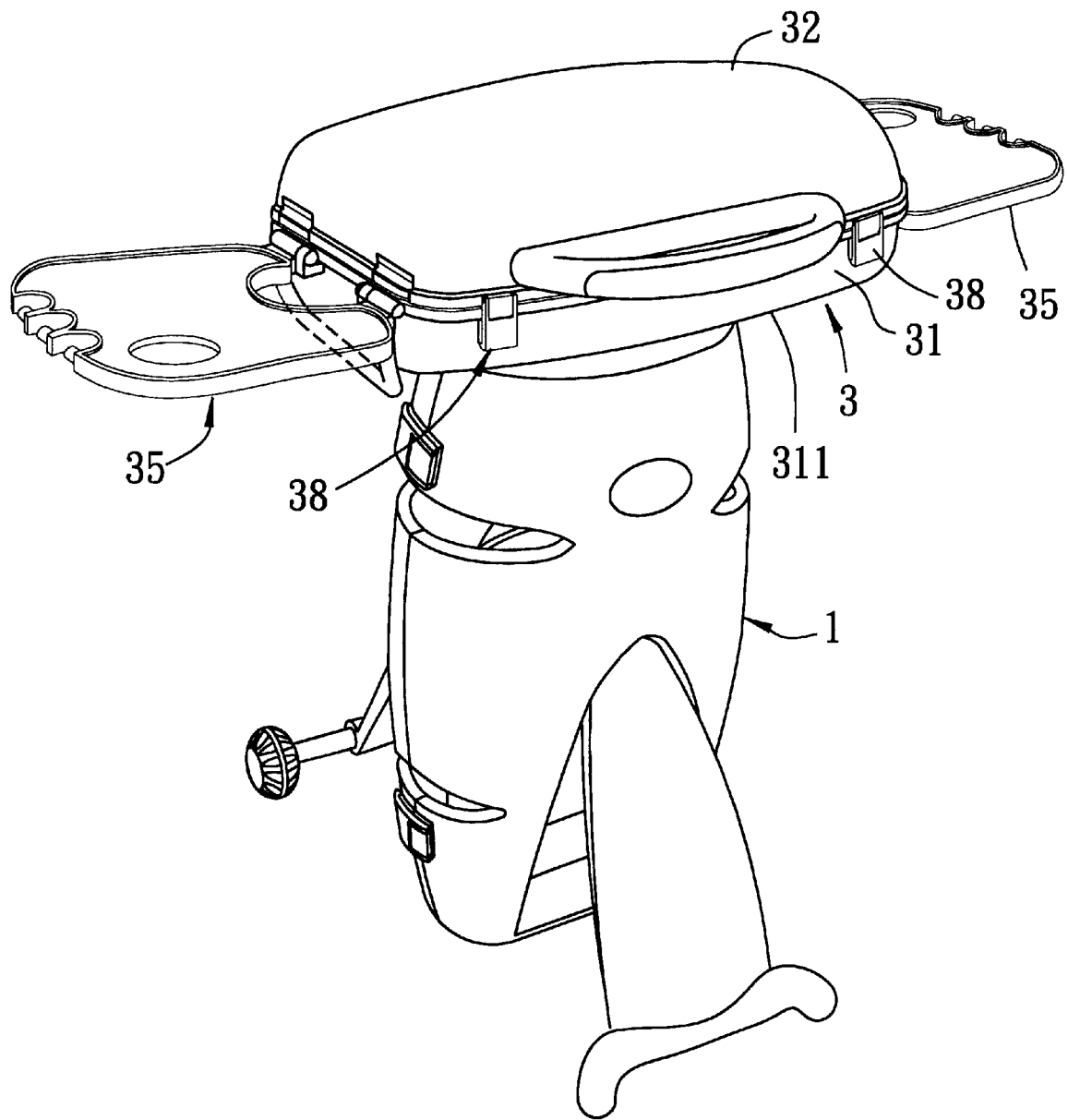
FIG. 2 is a perspective view of a preferred embodiment of a barbecue grill assembly of the present invention.

Referring to FIG. 2, the preferred embodiment of the barbecue grill assembly of the present invention is shown to mainly include a cook unit 3 and a casing 1. The casing 1 is adapted to stand uprightly on a ground surface for supporting the cook unit 3 thereon.

Figure 3:
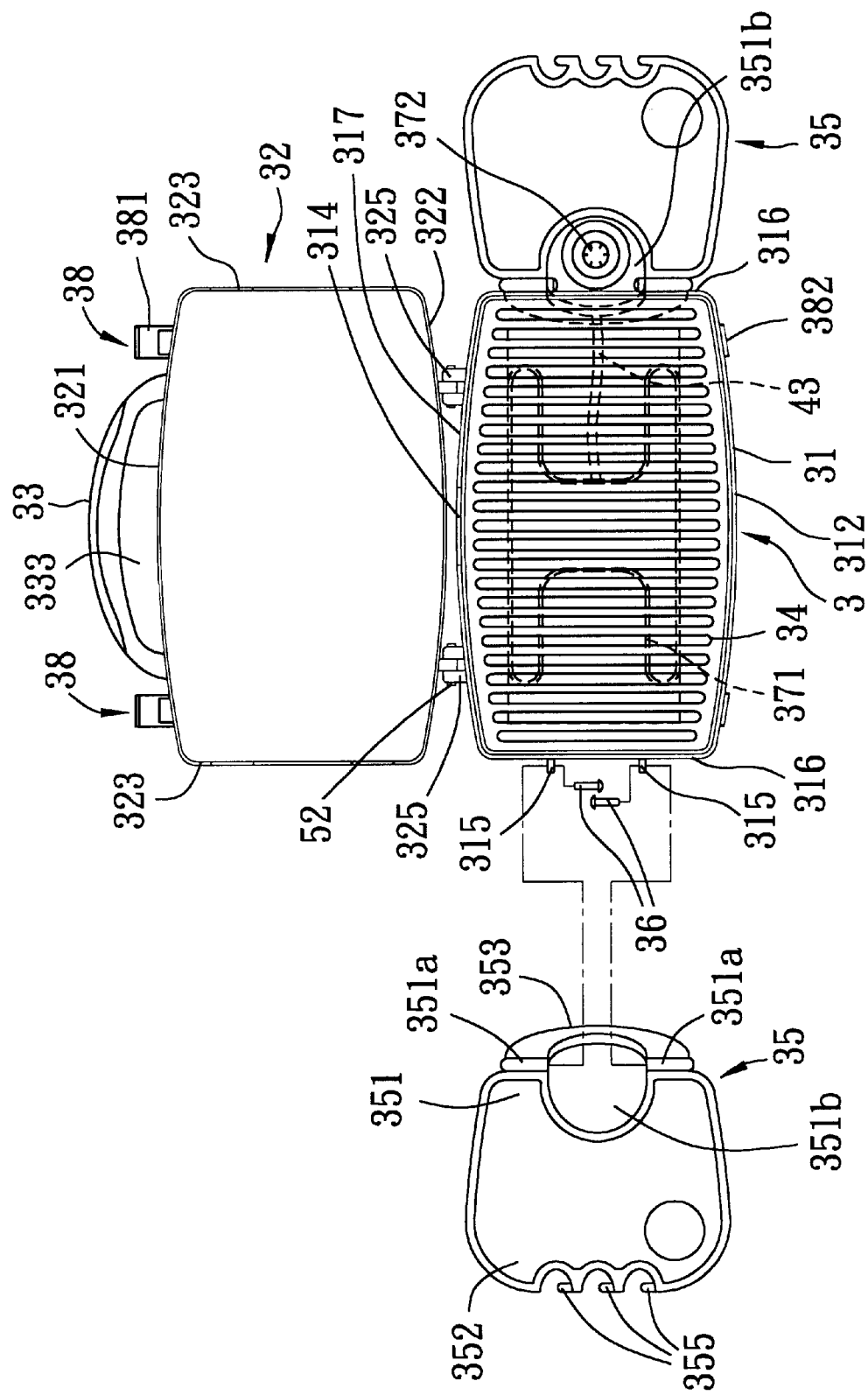
FIG. 3 is a top view illustrating how a pair of side racks are mounted on a cook unit of the barbecue grill assembly of FIG. 1.
Figure 4:
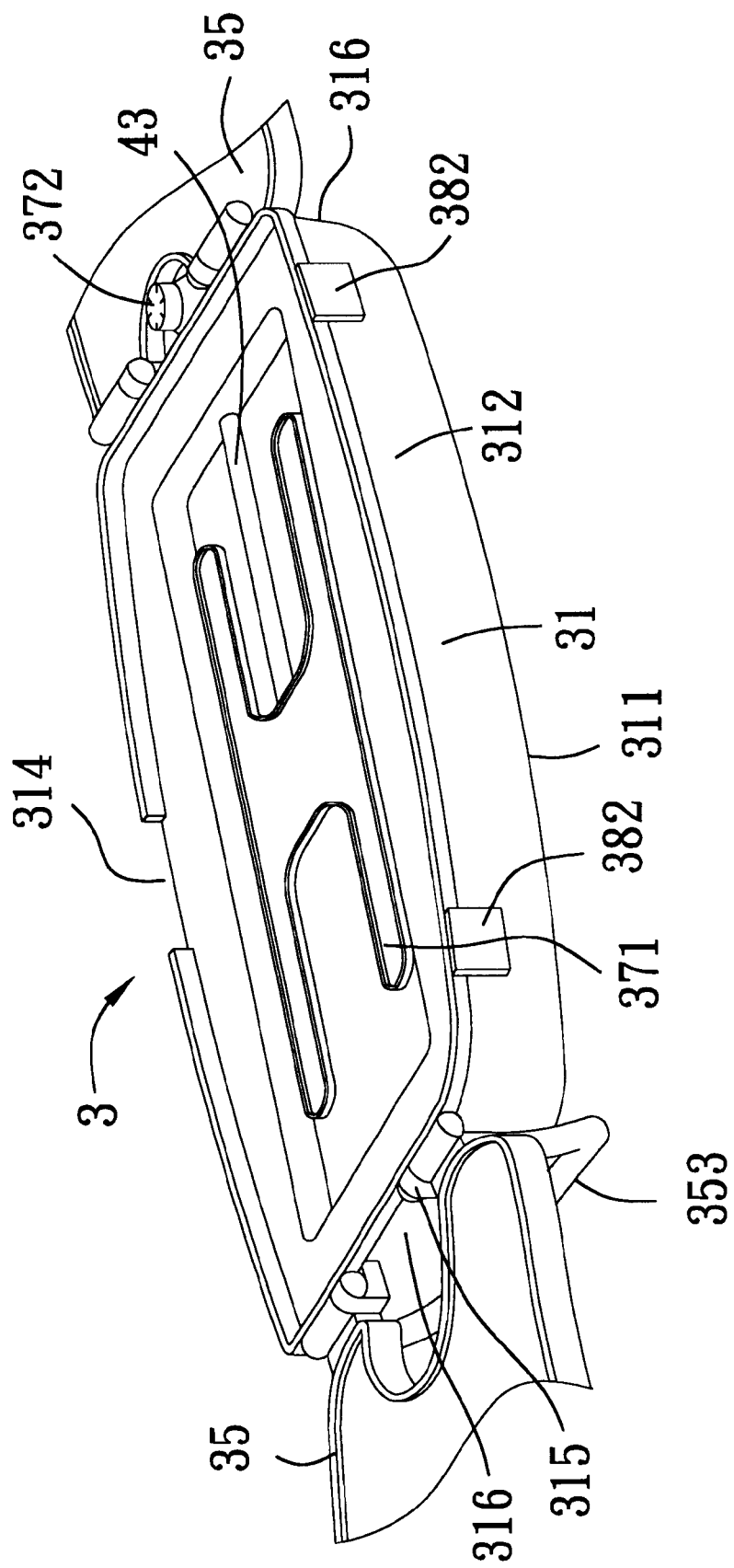
FIG. 4 is a fragmentary perspective view showing the cook unit with a grill member removed therefrom for the sake of clarity.
Figure 5:
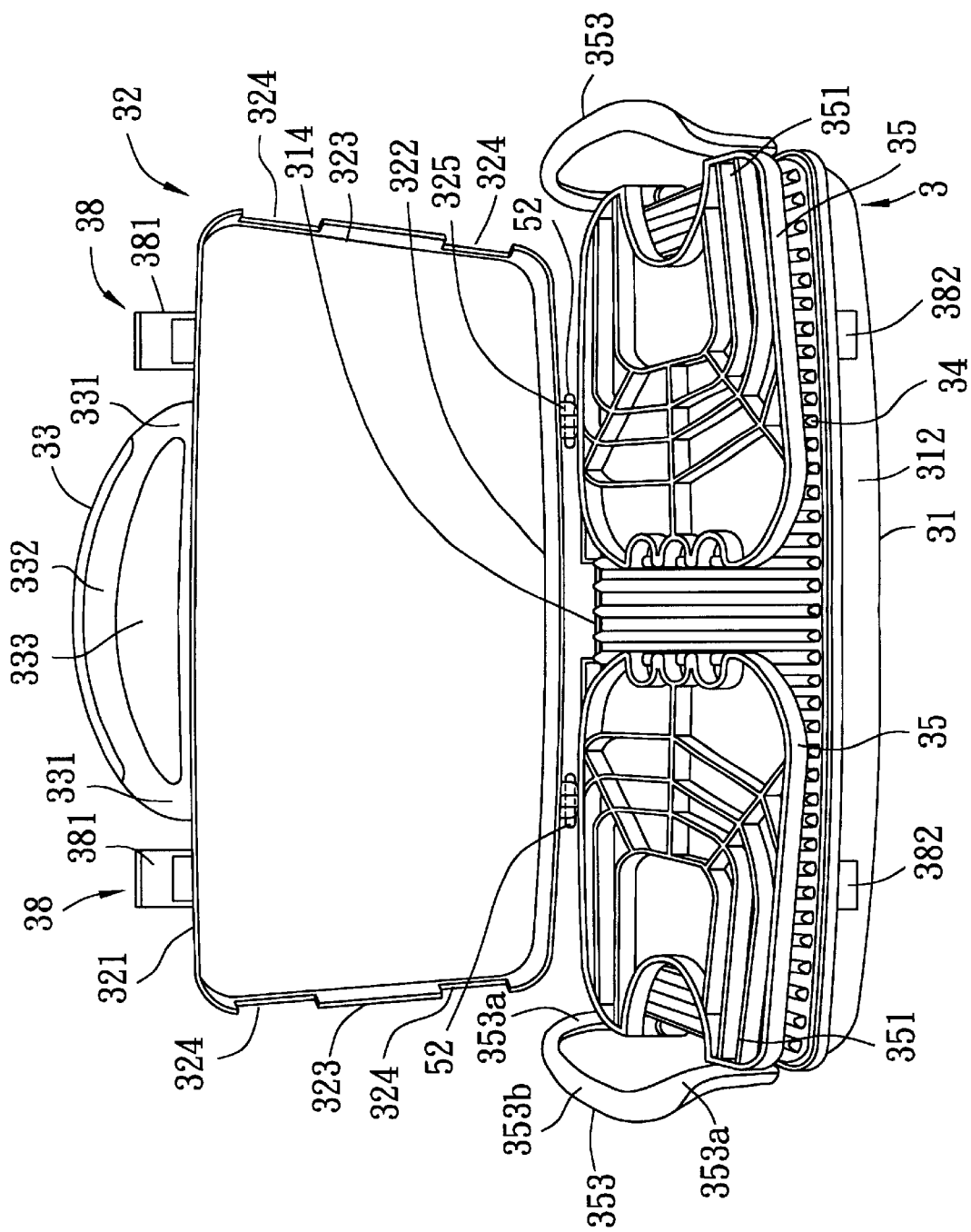
FIG. 5 illustrates the cook unit when the side racks are folded thereon.

The cook unit 3 may be installed removably on top of the casing 1 when the casing 1 is disposed in the upright position, or may be disposed at any other appropriate place. Referring to FIGS. 3 to 5, the cook unit 3 includes a hollow cooking base 31, a grill member 34 disposed in the cooking base 31, a top cover 32 disposed on a top side of the cooking base 31 for covering the grill member 34 and the top side of the cooking base 31, a handle 33 mounted on the top cover 32, and a fastening unit including a pair of fastening members 38 for releasably fastening together the top cover 32 and the cooking base 31. A burner 371 is installed within the cooking base 31 and is connected to a fuel connector 372 mounted on and disposed externally of the cooking base 31 via a fuel pipe 43 that extends therebetween. The fuel connector 372 is adapted to be connected to a fuel source (not shown) to permit the supply of fuel to the burner 371 within the cooking base 31.

Each of the top cover 32 and the cooking base 31 is generally rectangular in shape. The cooking base 31 has a bottom wall 311, front and rear side walls 312, 317 and left and right side walls 316 that extend upwardly from the bottom wall 311. The top cover 32 has a rear edge 322 hinged to an upper edge of the rear side wall 317 of the cooking base 31 by means of a pair of pivot lobe units 325 secured to the rear side wall 317 and a pair of pivot shafts 52. The top cover 32 further has a front edge 321 opposite to the rear edge 322, and left and right edges 323 interconnecting the front and rear edges 321, 322. The fastening members 38 are provided on the front edge 321 of the top cover 32 and the front side wall 312 of the cooking base 31 for releasably fastening together the front edge 321 of the top cover 32 and an upper edge of the front side wall 312 of the cooking base 31. Each fastening member 38 includes inter-engageable fastening parts 381, 382 fixed respectively to the front edge 321 of the top cover 32 and the front side wall 312 of the cooking base 31. The handle 33 is secured to the top cover 32 adjacent to the front edge 321. The handle 33 has a pair of connecting end portions 331 connected to the top cover 32, and a gripping portion 332 extending between the connecting end portions 331 and spaced apart from the front edge 321 of the top cover 32 so as to define a finger opening 333. The upper edge of the rear side wall 317 of the cooking base 31 is formed with a draining notch 314 adapted for draining liquid, such as oil generated during use of the cook unit 3, from the cooking base 31.

A pair of side racks 35 are mounted on the left and right side walls 316 of the cooking base 31. Each of the side racks 35 has a first end portion 351 and a second end portion 352 opposite to the first end portion 351 and extending from the first end portion 351 in a first direction. The first end portion 351 is forked so as to form a pair of pivot portions 351a and an opening 351b between the pivot portions 351a. The pivot portions 351a are mounted pivotally on an upper edge of a respective one of the left and right side walls 316 of the cooking base 31 by means of a pair of pivot shafts 36 that extend through a pair of pivot lobes 315 provided on the respective one of the left and right side walls 316 of the cooking base 31. The second end portion 352 of each of the side racks 35 is formed with a plurality of hook projections 355 for hooking of various barbecue utensils (not shown) thereon. Each of the side racks 35 is mounted with a respective handle bar 353 at the first end portion 351 thereof. Each of the handle bars 353 is substantially U-shaped, and has a pair of connecting sections 353a connected fixedly and respectively to the pivot portions 351a of a respective one of the side racks 35, and a gripping section 353b interconnecting the connecting sections 353a. Each of the handle bars 353 extends from the respective one of the side racks 35 in a second direction generally transverse to the first direction. That is, the handle bars 353 are generally transverse to the side racks 35.

Figure 6:
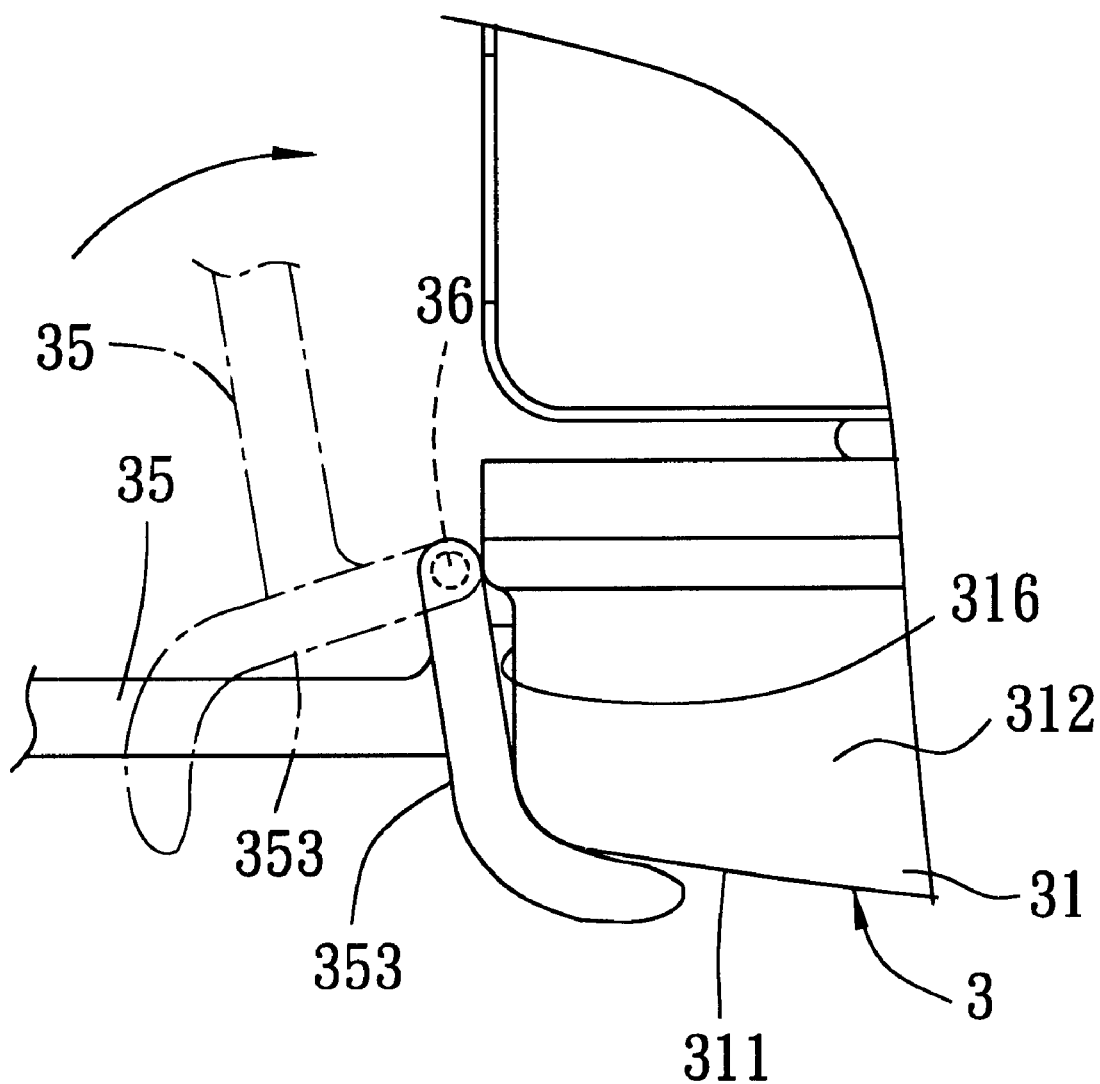
FIG. 6 is a fragmentary schematic side view of the cook unit, showing a folding operation of one of the side racks.

To use the cook unit 3, the top cover 32 is released from the cooking base 31 and is turned upwardly for uncovering the top side of the cooking base 31, and the side racks 35 are unfolded from the cooking base 31 so as to be disposed in a substantially horizontal orientation on left and right sides of the cooking base 31 and adjacent to the left and right side walls 316 of the cooking base 31, respectively. At this time, the handle bars 353 are oriented downwardly and abut against the left and right side walls 316 of the cooking base 31 for supporting the side racks 35 in the unfolded position, as shown in FIG. 6. The fuel connector 372 is disposed in the opening 351b when the right side one of the side racks 35 is turned to the unfolded position (see FIG. 4).

Figure 7:
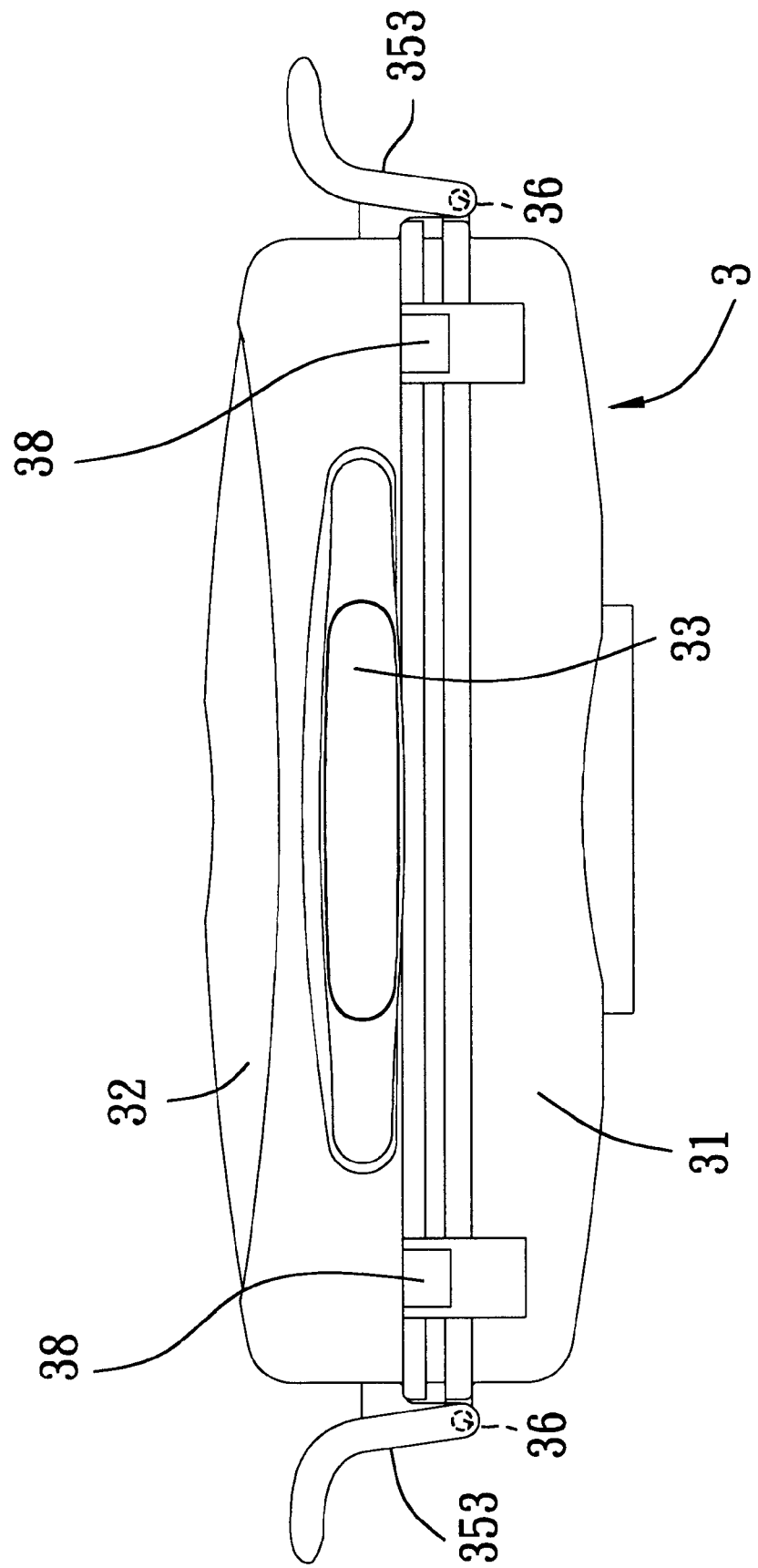
FIG. 7 shows the cook unit in a folded state.

Referring to FIGS. 5 and 7, when it is desired to store the barbecue grill assembly of the present embodiment after use, the side racks 35 are turned inwardly into the cooking base 31 for moving to a folded position, in which the side racks 35 are disposed within the cooking base 31 above the grill member 34. The top cover 32 is then turned toward the cooking base 31 for covering the side racks 35 and the top side of the cooking base 31. Each of the left and right edges 323 of the top cover 32 has a pair of recessed portions 324 for accommodating the forked first end portion 351 of a respective one of the side racks 35 such that the top cover 32 can be disposed fittingly on top of the cooking base 31 for covering the same when the side racks 35 are disposed in the folded position. At this time, the handle bars 353 on the side racks 35 are oriented upwardly and are disposed externally of the cooking base 31 and the top cover 32 to permit gripping thereat for handling the cook unit 3. Then, the top cover 32 is fastened to the cooking base 31 via the fastening members 38. The cook unit 3 can be carried by gripping at the handle bars 353 using both hands of the user or by gripping at the handle 33 using one hand of the user.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A barbecue grill assembly comprising:
a cooking base with a top side, a bottom wall opposite to said top side, and left and right side walls extending upwardly from said bottom wall;
a grill member disposed in said cooking base;
a top cover disposed on said top side for covering said grill member and said top side of said cooking base;
a first side rack having a first end portion pivoted to one of said left and right side walls of said cooking base, said first side rack being turnable inwardly into said cooking base for moving to a folded position in which said first side rack is disposed within said cooking base above said grill member and is covered by said top cover when said top cover is capped on said cooking base, said first side rack being further turnable outwardly from said cooking base for moving to an unfolded position in which said first side rack is disposed horizontally and laterally adjacent to said one of said left and right side walls of said cooking base;
a second side rack having a first end portion pivoted to another one of said left and right side walls, said second side rack being turnable inwardly into said cooking base for moving to a folded position in which said second side rack is disposed within said cooking base above said grill member and is covered by said top cover when said top cover is capped on said cooking base, said second side rack being further turnable outwardly from said cooking base for moving to an unfolded position in which said second side rack is disposed horizontally and laterally adjacent to said another one of said left and right side walls of said cooking base;
each of said first and second side racks further having a second end portion extending from said first end portion of a corresponding one of said first and second side racks in a first direction; and
a pair of handle bars, each of which is secured to said first end portion of a respective one of said first and second side racks and extends in a second direction transverse to said first direction, said handle bars being oriented downward when said side racks are disposed in the unfolded position and abutting against said left and right side walls, respectively, for supporting said first and second side racks in the unfolded position, said handle bars being oriented upward, being disposed externally of said cooking base, and being adapted to permit gripping thereat when said first and second side racks are disposed in the folded position.

2. The barbecue grill assembly as claimed in claim 1, wherein said first end portion of each of said first and second side racks is forked to form a pair of pivot portions that are pivoted to the respective one of said left and right side walls of said cooking base, said top cover having a rear edge hinged to said cooking base, a front edge opposite to said rear edge, and left and right edges interconnecting said front and rear edges, each of said left and right edges of said top cover having a pair of recessed portions for accommodating said pivot portions of a respective one of said first and second side racks when said side racks are disposed in the folded position such that said top cover can be disposed fittingly on top of said cooking base for covering said cooking base.

3. The barbecue grill assembly as claimed in claim 2, further comprising a handle secured to said top cover adjacent to said front edge of said top cover.

4. The barbecue grill assembly as claimed in claim 2, further comprising a fastening unit mounted on said top cover and said cooking base for releasably fastening together said top cover and said cooking base when said first side rack is disposed in the folded position, said fastening unit including a pair of fastening members, each of which includes inter-engageable fastening parts mounted respectively on said front edge of said top cover and said cooking base.

* * * * *